INVENTOR
Alfred B. White.

Patented Apr. 30, 1946

2,399,415

UNITED STATES PATENT OFFICE 2,399,415

ARC WELDING SYSTEM

Alfred B. White, Murrysville, Pa., assignor to Westinghouse Electric Corporation, East Pittsburgh, Pa., a corporation of Pennsylvania Application May 8, 1943, Serial No. 486,231

13 Claims. (Cl. 315—196)

My invention relates, generally, to welding systems and has reference in particular to heat-controlled arc welding systems.

Generally stated, it is an object of my invention to provide for controlling the heat in arc welding systems in a manner which is both simple and inexpensive.

More specifically, it is an object of my invention to provide for controlling the duration of flow of the welding current in each half cycle in alternating current arc welding systems, and for re-ionizing the arc path prior to the flow of welding current in each half cycle.

It is also an object of my invention to provide for increasing the ionization of the gap between the arc welding electrode and the work in heat-controlled arc welding systems by means of relatively steep wave front impulses produced when the arc welding circuit is energized from the source of alternating current during other than the initial portion of each half cycle.

Another object of my invention is to provide for delaying the point in each half cycle at which an arc welding circuit is connected for energization from an alternating current source and storing sufficient energy in an energy storage device during the non-conductive portions of each half cycle to produce relatively steep wave front impulses at the arc when the welding circuit is connected for energization from the source.

Yet another object of my invention is to provide for increasing the charging voltage applied to a condenser connected in series with the heat control valves of an arc welding circuit so as to increase the value of the ionizing impulses produced thereby when the heat control is set for relatively low values of arc welding current.

Still another object of my invention is to provide for controlling the heat in an arc welding system without requiring the connection of the heat control circuit directly to the arc welding circuit.

Other objects will, in part, be obvious and will, in part, be explained hereinafter.

In practicing my invention, inversely connected valves are used to connect the primary of the arc welding transformer to a source of alternating current. The valves are rendered conductive by control electrodes which may be energized from the source through phase shifting means whereby the point in each half cycle at which the valves are rendered conductive may be varied and predetermined. A condenser is connected between the anodes of the valves in series with an oscillation damping resistor and the primary winding of a transformer. The secondary winding of the transformer is connected to the secondary circuit of the arc welding transformer to produce a relatively steep front voltage impulse between the welding electrode and the work when either of the valves is rendered conductive.

For a more complete understanding of the nature and scope of my invention, reference may be made to the accompanying drawing, in which.

Figure 1:
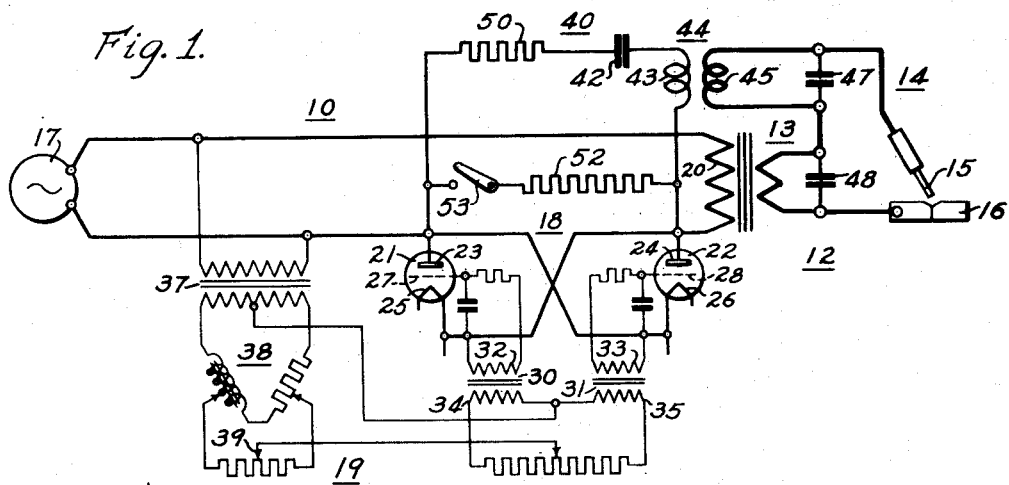
Figure 1 is a diagrammatic view of an arc welding system embodying one form of the invention.

Referring to Fig. 1, the reference numeral 10 may denote generally a heat-controlled arc welding system wherein an arc welding circuit 12, comprising a welding transformer 13 and an arc electrode circuit 14 including a welding electrode 15 and work 16 upon which a welding operation is to be performed, may be connected for energization from a suitable source of alternating current such as the generator 17 by switch means 18.

In order to provide heat control for the arc welding circuit 12, heat control means 19 may be provided for causing the switch means 18 to connect the primary winding 20 of the welding transformer 13 to the source 17 at different predetermined points in each half cycle, other than the beginning of the cycle.

The switch means 18 may comprise a pair of arc discharge devices 21 and 22 having anodes 23, 24, and cathodes 25, 26 inversely connected in series with the primary winding and the source, and control electrodes 27 and 28, respectively. The conductivity of the arc discharge devices 21 and 22 may be controlled by applying variable control voltages to the control electrodes 27 and 28 by means of the heat control means 19. For example, grid transformers 30 and 31 may be provided, having secondary windings 32 and 33 connected between the cathodes and control grids of their respective arc discharge devices. The primary windings 34 and 35 may be connected to a source of control potential such as the control transformer 37 through a phase shifting circuit 38 having an adjustable tap 39 which provides for shifting the phase of the control voltages applied to the grid transformers relative to the voltage of the source. By thus shifting the phase of the control voltages, the arc discharge devices 21 and 22 may be rendered conductive at different predetermined points in each half cycle, thereby varying the duration of current flow and the average value of the current impulses in each half cycle, and controlling the heat in the arc welding circuit.

In order to assist in initiating and stabilizing the arc when the heat control means 19 is adjusted to render the arc discharge devices 21 and 22 conductive during the intermediate or latter portions of each half cycle, control means 40 may be provided for producing relatively steep wave front voltage impulses at the instant each of the arc discharge devices is rendered conductive. For example, a condenser 42 may be connected in bridged relation between the anodes 23 and 24 of the arc discharge devices, having the primary winding 43 of an air core transformer 44 connected in series circuit relation thereto. The secondary winding 45 of the transformer 44 may be connected to the arc electrode circuit in any suitable manner, being connected either in shunt therewith or being, for example, connected in series circuit relation with the secondary winding of the welding transformer 13 and the welding electrode 15. A condenser 47 may be connected across the secondary winding 45 to increase the voltage and intensity of the stabilizing impulse. An auxiliary condenser 48 may be connected across the secondary winding of a welding transformer to by-pass the voltage impulse produced by the transformer 44 around the secondary winding. In order to prevent the condenser 42 from producing an oscillatory discharge through the arc discharge devices 21 and 22, a damping resistor 50 may be connected in series circuit relation with the condenser 42 and the arc discharge devices.

Figure 2:
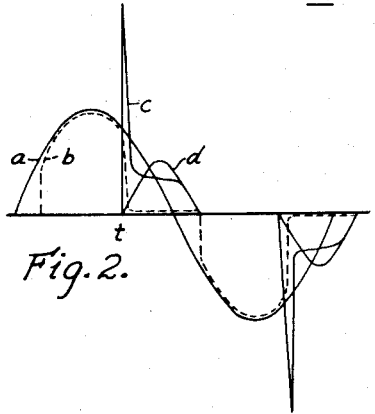
Figs. 2, 3 and 4 illustrate voltage and current curves showing how the system of Fig. 1 operates.

During the non-conducting portion of each half cycle substantially the full line voltage appears between the anodes 23, 24 and the cathodes 25, 26 of the arc discharge devices. Accordingly, the voltage of the condenser 42 at any instant during the non-conducting portions of each half cycle normally corresponds subtantially to the instantaneous value of the line voltage. This condition is clearly illustrated in Fig. 2 where the curve a denotes the line voltage and the dotted curve b denotes the condenser voltage.

As soon as the line voltage reaches a sufficiently high value for a given bias voltage on the control electrodes 27 and 29 at a time t, the arc discharge device having a positive potential on its anode is immediately rendered conductive. The condenser 42 immediately discharges through the primary winding 43 of the air core transformer 44 and through the conducting arc discharge device. The condenser voltage drops abruptly at the end of the half cycle as shown by the relatively steep portion of the condenser voltage curve b. The sudden discharge of the condenser 42 through the primary winding 43 produces a relatively steep wave front voltage impulse in the secondary winding 45 which is impressed across the gap between the electrode 15 and a work 16. This voltage impulse which is denoted by the relatively steep initial portion of the curve c in Fig. 2 immediately ionizes the gap between the electrode and the work, or increases the existing ionized state thereof sufficiently so that the flow of arc welding current from the welding transformer 13 through the connection of the primary winding 20 thereof to the source by the conductive arc discharge device takes place across the ionized path. The curve d of Fig. 2 indicates the arc welding current and the flattened tail portion of the curve c designates the arc electrode circuit voltage during the maintenance of the arc.

Upon the termination of the flow of arc welding current at the end of the first half cycle, a relatively long non-conducting period follows until the other arc discharge device is rendered conductive in the succeeding half cycle. During this period of non-conductivity, the arc path becomes at least partially deionized and at the same time the condenser 42 is charged in the opposite direction. Immediately upon the other arc discharge device being rendered conductive, it discharges again, producing a relatively steep wave front voltage impulse which ionizes the arc path sufficiently to permit the flow of the succeeding impulse of arc welding current. The condenser 42 continues to be charged in opposite directions in succeeding half cycles and discharges each time one of the arc discharge devices is rendered conductive to connect the primary winding 20 to the source and initiate the flow of welding current from the arc welding transformer 13. In this manner, relatively low average values of arc welding currents, consisting of higher current pulses with relatively long intervals of non-conductivity between them, may be utilized. This greatly facilitates the welding of relatively thin sheets where periodic impulses of arc current appear to produce greatly improved weld results.

Figure 3:
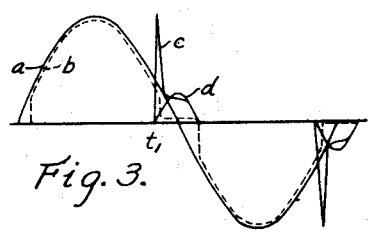

When it is desired to use exceedingly low welding currents, such as indicated by the current wave d in Fig. 3, it will be noted that the condenser voltage b has already reached a relatively low value by the time t1 when the arc discharge devices 21 and 22 are rendered conductive. Accordingly, the voltage impulses produced by discharging the condenser 42 and indicated by the peaked initial portion of the arc electrode circuit voltage curve c will be of a relatively low value when it is connected as hereinbefore described.

In order to increase the condenser voltage when the heat control 19 is set for relatively low values of welding current, means such as the impedance 52 may be provided. By connecting the impedance 52, which may in this instance comprise a resistor, across the anodes of the arc discharge devices 21 and 22 through a suitable switch 53, the voltage across the condenser 42 during the non-conducting portion of each half cycle may be substantially increased. The resistor 52 in this instance carries the magnetizing current of the welding transformer 13 during the non-conducting portions of each half cycle, so that a voltage drop is produced thereby which is impressed across the condenser 42.

Figure 4:
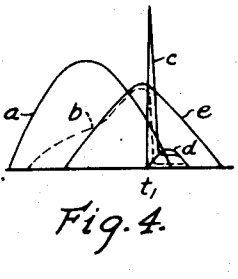

Referring to Fig. 4, it will be seen that the voltage across the resistor 52 which is represented by the curve e lags the line voltage somewhat on the order of 60°. Since this lagging voltage is impressed across the condenser 42, the condenser voltage represented by the dotted line b does not drop to the relatively low value reached by the line voltage at the time t1 when one or the other of the arc discharge devices is rendered conductive, but instead, retains a relatively high value on the order of the instantaneous value of the voltage e. Accordingly, when one or other of the arc discharge devices is rendered conductive to produce the relatively small current impulse d, a relatively high charge exists on the condenser 42 and the discharge of this condenser through the primary winding of the air core transformer 44 produces a relatively steep wave front impulse c which is sufficiently great to ionize the arc gap and assist in stabilizing and maintaining a relatively stable arc at the lower value of arc current.

Figure 5:
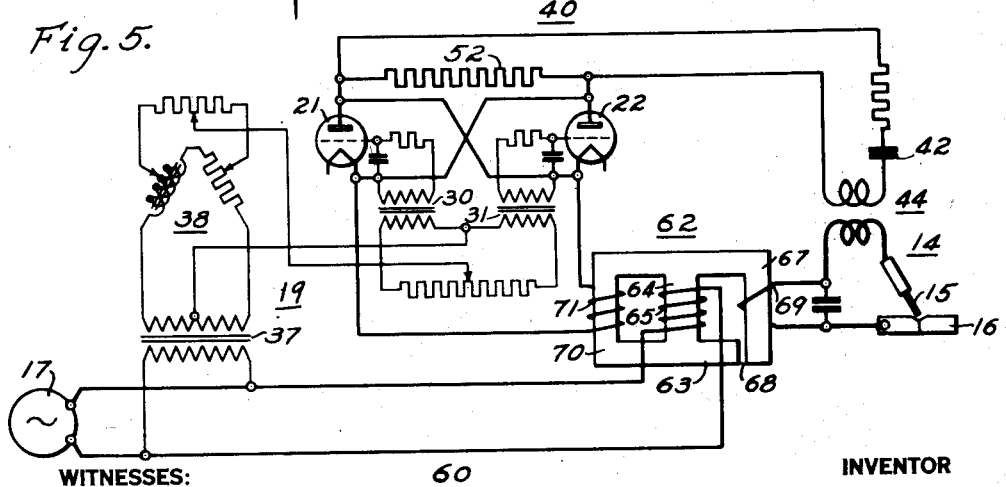
Fig. 5 is a diagrammatic view of an arc welding system embodying another form of the invention.

Referring to Fig. 5, the reference numeral 60 may denote generally an arc welding system wherein an arc electrode circuit 14 including an arc welding electrode 15 and work 16 is disposed to be energized from a suitable source of alternating current 17. Instead of utilizing the switch means 18 to connect the primary winding 20 of the welding transformer 13 to the source 17 directly, whereby the full value of the line current must be handled by the arc discharge devices 21 and 22, as in Fig. 1, they may be connected in the primary circuit of a transformer supplying the primary winding 20, connected into the supply line to the source 17 through a step-up series transformer in a manner well known in the art, or they may be connected as shown in Fig. 15 in connection with a control transformer 62 to control the energization of the arc electrode circuit 14 indirectly.

The control transformer 62 may comprise a suitable magnetic core, such as the substantially H-shaped magnetic core member 63, having a central leg portion 64 with a primary winding 65 positioned thereon and connected to the source 17. At one end of the H-shaped core member 63, an end yoke 67 may be provided having an air gap 68 at one end. A secondary winding 69 may be positioned on the yoke 67 and connected to the electrode 15 and work 16 for maintaining an arc therebetween. The other end of the H-shaped core member may be bridged by a yoke 70 providing a substantially closed magnetic circuit and having a control winding 71 positioned thereon.

The inversely connected arc discharge devices 21 and 22 of the switch means 18 may be connected across the control winding 71. Control of the conductivity of the arc discharge devices may be effected in a similar manner to that shown in Fig. 1 through the use of grid transformers 30 and 31 which may be energized from a control transformer 37 through a phase shifting circuit 38. A condenser 42 and air core transformer 44 may be used in a similar manner to that described in connection with Fig. 1 for producing relatively steep wave front voltage impulses each time one or another of the arc discharge devices is rendered conductive.

Heat control of the arc welding current may be obtained by controlling the flux linkages between the primary winding 65 and the secondary winding 69 through short circuiting and open circuiting the control winding 71. The magnetic flux from the primary winding 65 passes in part through the secondary winding 69 and in part through the control winding 71. As long as the control winding 71 is open circuited, the major portion of the flux is free to pass through the yoke 70 which provides an extremely high leakage reactance for the rest of the control transformer. If, however, the control winding 71 is short circuited by either one of the arc discharge devices 21 and 22, a demagnetizing current flows in the short circuited winding which forces the primary flux to pass through the secondary winding 69. The leakage reactance is thus reduced to a relatively low value, depending upon the point in each half cycle at which the arc discharge devices are energized and a corresponding arc welding current flows in the arc electrode circuit 14. The air gap 68 insures most of the flux passing through the yoke 70 when the arc discharge devices are not conductive, thus balancing the demagnetizing effect of the impedance 52 and causing the control circuit 40 to operate under more advantageous voltage conditions.

From the above description and the accompanying drawing, it will be apparent that I have provided in a simple and effective manner for controlling the heat in arc welding systems. The normally disadvantageous arc conditions created by preventing the flow of welding current during predetermined portions of each half cycle are eliminated by providing a relatively steep wave front ionizing voltage at the instant each of the arc discharge devices is rendered conductive. Accurate control of the arc welding current through a relatively wide range may thus be secured. Since control of the arc discharge devices merely requires variation of the control voltages applied to the control electrodes thereof, this method of heat control readily lends itself to control from remote positions. The welding of relatively thin sheet metal may be greatly facilitated by using an arc welding system embodying the features of this invention.

Since different embodiments of the invention may be made without departing from the scope or spirit thereof, it is intended that all the matter contained in the above description or shown in the accompanying drawing shall be considered as illustrative and not in a limiting sense.

I claim as my invention:

1. An arc welding system comprising, a welding transformer having a secondary winding for connection to an arc circuit including a welding electrode and work upon which an arc welding operation is to be performed and a primary winding, inversely connected valve means having circuit means controlling the instant in each half cycle at which the primary winding is connected to a source of alternating current so as to provide heat control, and circuit means including energy storage means connected in shunt relation with the valve means so as to be charged during the non-conducting portion of each half cycle and coupled with the arc circuit independently of the welding transformer so as to discharge through the valve means and produce a single relatively steep wave front impulse between the work and the electrode each time the valve means is rendered conductive to connect the primary winding to the source.

2. Arc welding apparatus comprising, an arc welding transformer having primary and secondary circuits, valve means having heat control means operable to connect the primary circuit of the arc welding transformer to a source of alternating current at different predetermined points in each half cycle, and circuit means including a condenser and a damping resistor connected in parallel relation with the valve means and coupled to the secondary circuit externally of the welding transformer to produce a single steep wave front impulse in the secondary circuit each time the valve means connects the primary circuit to the source.

3. The combination with an arc welding transformer having a secondary circuit for supplying electrical energy to an arc circuit and a primary circuit for connection to a source of alternating current at predetermined points in each half cycle by inversely connected valve means which are periodically rendered conductive and nonconductive and are provided with heat control means for delaying the instant of conductivity in each half-cycle, of circuit means including energy storage means connected to the anodes of the valve means for storing electrical energy during portions of each half cycle in which the valves are non-conducting and discharging through them when they are rendered conductive, and energy translating means connected to the circuit means and to the secondary circuit to apply an ionizing potential impulse to the secondary circuit from the energy storage means only at the instant when either of the valve means becomes conductive.

4. A heat control system for an arc welding circuit comprising, a pair of valve means having control electrodes and principal electrodes inversely connected between the arc welding circuit and a source of alternating current, a control circuit including phase shifting means connected to the control electrodes for rendering the valve means periodically conductive at different predetermined points in alternate half cycles, and an ionizing circuit including a condenser connected between the valve means and a transformer having one winding connected in series circuit relation therewith and another winding coupling the condenser to the arc welding circuit to provide a single ionizing impulse thereto each time one of the valve means is rendered conductive at a delayed point in a half cycle.

5. An arc welding system comprising, an arc welding transformer having primary and secondary circuits connected to a source of alternating current and to an electrode circuit respectively, heat control means associated with the primary circuit including inversely connected valve means connecting the primary circuit of the welding transformer to the source at variable predetermined delayed points in each half cycle, and circuit means for producing an ionizing voltage in the electrode circuit only at the instant the primary circuit of the welding transformer is connected to the source comprising a condenser connected in shunt with the valve means so as to be charged during the nonconducting portion of each half cycle and discharged when one of the valve means becomes conductive, and an air core transformer having one winding connected in series circuit relation with the condenser and another winding connected to the secondary circuit to produce an ionizing impulse in the electrode circuit when the condenser discharges.

6. An arc stabilizing system for a heat-controlled arc welding system having an arc welding transformer with primary and secondary circuits for connection to a source of alternating current and an arc circuit respectively, and a pair of inversely connected valve means connected between the transformer and the source for connecting the primary circuit to the source at different predetermined delayed time intervals in successive half-cycles comprising, a condenser connected in series circuit relation with the transformer and the source between the valve means so as to be charged during the portion of a half-cycle that the valve means are nonconductive and discharged whenever one of the valve means becomes conductive, impedance means controlling the charging and discharging rate of the condenser, and an air core transformer having one winding connected in series circuit relation with the condenser and another winding connected to the arc circuit for producing a steep wave front impulse therein each time one of the valve means becomes conductive.

7. An ionizing system for an arc welding system including an arc electrode circuit which is connected to a source of alternating current for only predetermined portions of each half cycle by a pair of inversely connected valve means having anodes and cathodes comprising, a condenser connected between the anodes of the valve means for storing electrical energy during the nonconductive portion of each half-cycle, a damping resistor connected in series circuit relation with the condenser for determining the discharge characteristic of the condenser through the valve means, and a transformer having one winding connected in series circuit relation with the condenser for providing a discharge circuit therefor having a relatively high natural frequency and another connected to the arc electrode circuit for producing a steep wave front impulse in the electrode circuit each time one of the valve means is rendered conductive.

8. A control system for an arc welding system having a welding transformer with primary and secondary circuits comprising, valve means having a control circuit for rendering said means conductive for predetermined portions of successive half cycles for connecting the primary circuit to a source of alternating current, a condenser connected in shunt relation with the valve means for producing a single steep wave front discharge impulse each time the valve means conducts, an impedance connected in shunt with the condenser, and an air core transformer having one winding connected in series circuit relation with the condenser to provide a discharge circuit having a relatively high natural frequency and another winding connected to the secondary circuit for producing relatively steep wave front impulses therein at the instant each valve means is rendered conductive.

9. The combination with an arc electrode circuit including work and an arc electrode in spaced relation and bidirectional valve means having anodes and cathodes for connecting the electrode circuit to a source of alternating current, of a condenser and a damping resistor connected in shunt circuit relation with the anodes and cathodes of the valve means to provide a discharge circuit for a single pulse of arc initiating current through whichever of the valve means is conductive, and transformer means coupling the discharge circuit to the arc electrode circuit.

10. Arc welding apparatus comprising, an arc welding transformer having primary and secondary circuits, a pair of valve means having anodes and cathodes inversely connected between the transformer and a source of alternating current for connecting the transformer to the source for predetermined portions of successive half cycles, a condenser connected between the anodes, a damping resistor connected in series circuit relation with the condenser, condensers connected in shunt and series circuit relations with the secondary circuit, and transformer means having one winding connected in series circuit relation with the condenser between the anodes and another winding connected in shunt circuit relation with the series capacitor in the secondary circuit.

11. The combination in an arc welding system including an arc welding transformer having primary and secondary circuits, of heat control means including a pair of inversely connected valve means having anode-cathode circuits connected between the primary circuit and a source of alternating current and control electrodes, control means for energizing the control electrodes to render the valve means conductive for predetermined portions of alternate half cycles, means associating the anode-cathode circuits with the source for controlling the energization of the secondary circuit, ionizing means including an energy storage circuit connected between the anodes of the valve means, and transformer means having one winding connected to provide a discharge path for the energy storage circuit and another winding coupling the discharge path of the energy storage circuit to the secondary circuit.

12. An arc welding system comprising, a transformer having a three-legged magnetic core with a closed magnetic circuit at one end and an air gap in the magnetic circuit at the other end, a primary winding positioned on the intermediate leg connected to a source of alternating current, a secondary winding positioned on the leg at the end having the magnetic circuit with an air gap and connected to an arc electrode circuit, a control winding positioned on the leg at the other end, a pair of valve means having control electrodes and anodes and cathodes inversely connected across the control winding, control means for applying a control potentials to the control electrodes for rendering the valve conductive at different predetermined points in each half cycle, and ionizing means including a condenser connected between the anodes and a control transformer having one winding connected in series circuit relation with the condenser and another winding connected to the arc electrode circuit.

13. A heat control system for an arc welding system having an arc electrode circuit connected to a source of alternating current by a welding transformer comprising, valve means having control electrodes and anodes and cathodes inversely connected between the transformer and the source, control means for applying control voltages to the control electrodes to render the valve means conductive for different predetermined portions of successive half cycles, a condenser and a damping resistor connected in series circuit relation between the anodes, a control impedance bridging the anodes, and an air core transformer having a primary winding connected in series circuit relation with the condenser and a secondary winding connected in series circuit relation with the arc electrode circuit.

ALFRED B. WHITE.